US012540977B2

(12) United States Patent
Yi et al.

(10) Patent No.: US 12,540,977 B2
(45) Date of Patent: Feb. 3, 2026

(54) CHIP FOR MONITORING PERFORMANCE OF MOTOR, AND PERFORMANCE MONITORING SYSTEM FOR ROTATING APPARATUS

(71) Applicant: Aktiebolaget SKF, Gothenburg (SE)

(72) Inventors: Xing Yi, Shanghai (CN); Liang Weng, Hangzhou (CN); Kaihuan Zhang, Hangzhou (CN); Xiaoyuan Ma, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 160 days.

(21) Appl. No.: 18/484,913

(22) Filed: Oct. 11, 2023

(65) Prior Publication Data

US 2024/0125853 A1 Apr. 18, 2024

(30) Foreign Application Priority Data

Oct. 14, 2022 (CN) .......................... 202211261560.3

(51) Int. Cl.
| | |
|---|---|
| H02P 29/024 | (2016.01) |
| G01R 31/34 | (2020.01) |
| H02K 11/20 | (2016.01) |
| H02K 11/21 | (2016.01) |
| H02H 7/08 | (2006.01) |

(52) U.S. Cl.
CPC .......... *G01R 31/343* (2013.01); *H02K 11/21* (2016.01); *H02P 29/024* (2013.01); *H02H 7/08* (2013.01)

(58) Field of Classification Search
CPC ...... G01R 31/343; G01R 31/34; H02K 11/21; H02K 11/20; H02P 29/024; H02P 25/098; G05B 2219/3311; G05B 2219/41127; G01B 9/0207; H01L 22/00
See application file for complete search history.

(56) References Cited

U.S. PATENT DOCUMENTS

| | | | |
|---|---|---|---|
| 2007/0138624 A1* | 6/2007 | Sudo ................... | H01L 23/3121 257/E23.125 |
| 2015/0168268 A1* | 6/2015 | Fish ...................... | G01H 1/003 374/142 |
| 2020/0195187 A1* | 6/2020 | Kiribuchi ............... | H02K 11/21 |
| 2021/0083557 A1* | 3/2021 | Yamaguchi ............ | H02K 11/21 |
| 2024/0055955 A1* | 2/2024 | Eidschun ............... | H02K 11/20 |

\* cited by examiner

*Primary Examiner* — Arleen M Vazquez
(74) *Attorney, Agent, or Firm* — Stinson LLP

(57) ABSTRACT

The present disclosure discloses a chip for monitoring performance of a motor and a performance monitoring system for a rotating apparatus. The system includes a sensing module, including a plurality of sensing sensors. The sensing module detecting a working state of the rotating apparatus and generating a working condition signal. A diagnosis module receives the working condition signal from the sensing module, determines a performance state of the rotating apparatus based on the working condition signal, and generates a performance state detection result. The performance state detection result includes a normal performance state and an abnormal performance state. A communication module sends an alarm signal to a central control platform when the performance state detection result is the abnormal performance state. The sensing module, the diagnosis module and the communication module are integrated on the same chip.

16 Claims, 2 Drawing Sheets

CHIP FOR MONITORING PERFORMANCE OF MOTOR, AND PERFORMANCE MONITORING SYSTEM FOR ROTATING APPARATUS

CROSS-REFERENCE TO RELATED APPLICATION

This application claims priority to Chinese Application No. 202211261560.3, filed Oct. 14, 2022, the entirety of which is hereby incorporated by reference.

FIELD

The present disclosure relates to the field of detection control, and in particular to a chip for monitoring performance of a motor and a performance monitoring system for a rotating apparatus.

BACKGROUND

At present, in a process of performance monitoring of a rotating apparatus, a plurality of functional modules for performance monitoring are usually arranged independently of each other, and these functional modules usually do not need to be directly installed in the rotating apparatus (e.g., a bearing). However, with the wide application in civil and commercial fields, the rotating apparatus, especially a performance monitoring system for the rotating apparatus, is also confronted with higher requirements. For example, miniaturization is just one of these requirements. Accordingly, a chip for monitoring performance of the rotating apparatus (e.g., a motor) is also faced with demands of higher degree of integration and smaller size.

Therefore, there is a need for a monitoring system with high degree of integration of related functional modules for performance monitoring on the premise of achieving satisfied monitoring control of the performance of the rotating apparatus, and a monitoring chip with higher degree of integration and smaller size on the basis of achieving satisfied monitoring of the performance of the rotating apparatus.

SUMMARY

In view of the above problems, the present disclosure provides a chip for monitoring performance of a motor and a performance monitoring system for a rotating apparatus. On the premise of achieving satisfied monitoring control of the performance of the rotating apparatus, the chip and the performance monitoring system have high degree of integration of internal functional modules and small volume, and involve, for example, low manufacturing cost and possess high monitoring performance.

According to an aspect of the present disclosure, it provides a chip for monitoring performance of a motor. The chip includes: a chip substrate; a sensing circuit including a plurality of sensing subcircuits and configured to detect a state of the motor and generate a working condition signal of the motor; a controller circuit including a diagnosis subcircuit and a communication subcircuit, wherein the diagnosis subcircuit is configured to receive the working condition signal from the sensing circuit, determine a performance state of the motor based on the working condition signal and generate a performance state detection result, and is operatively configured to communicate with an external device via the communication subcircuit based on the performance state detection result; and wherein the sensing circuit and the controller circuit are integrated on a single chip substrate.

In some embodiments, a size of the chip is in the range from 0.5 mm×0.5 mm×0.5 mm to 30 mm×30 mm×20 mm; and the sensing circuit and the controller circuit on the chip substrate are connected through a microstrip, a stripline or a copper foil.

In some embodiments, the sensing circuit includes at least one selected from the group consisted of a vibration sensing subcircuit for the motor, a magnetic field sensing subcircuit for the motor and a temperature sensing subcircuit for the motor.

In some embodiments, the diagnosis subcircuit includes a feature extraction submodule circuit configured to extract a feature from the working condition signal and generate a feature signal; an abnormality detection submodule circuit configured to determine the performance state of the motor according to the feature signal based on an abnormality detection rule and generate a performance state detection result of the motor; wherein the performance state detection result is one selected from the group consisted of a normal performance state, a slightly abnormal performance state and a severely abnormal performance state.

In some embodiments, the abnormality detection submodule circuit includes a feature comparison module circuit configured to compare each feature signal with a corresponding preset signal threshold range, and determine an abnormality rate of the feature signal based on a comparison result; a feature weighting module circuit configured to perform a weighted average to abnormality rates of respective feature signals to obtain a total abnormality rate; and a result output module circuit configured to determine the performance state detection result of the motor based on the total abnormality rate and based on a preset abnormality judgment rule.

In some embodiments, the result output module circuit is configured to compare the total abnormality rate with a first abnormality rate range, a second abnormality rate range and a third abnormality rate range, respectively, and determine the performance state detection result of the motor based on a comparison result; wherein the first abnormality rate range corresponds to the normal performance state, the second abnormality rate range corresponds to the slightly abnormal performance state, and the third abnormality rate range corresponds to the severely abnormal performance state.

In some embodiments, the diagnosis subcircuit further includes a malfunction diagnosis submodule circuit, and the malfunction diagnosis submodule circuit determines a corresponding malfunction diagnosis frequency based on the performance state detection result.

In some embodiments, the malfunction diagnosis submodule circuit is configured to determine a malfunction mode of the motor based on the working condition signal and the feature signal when the performance state detection result is the slightly abnormal performance state or the severely abnormal performance state.

In some embodiments, the diagnosis subcircuit further includes a remaining useful life determination submodule circuit configured to determine a remaining useful life of the motor and/or a core component of the motor based on the feature signal.

In some embodiments, the working condition signal of the motor includes at least one selected from the group consisted of a vibration signal of the motor, a magnetic field signal of the motor, a temperature signal of the motor, a rotating shaft speed signal of the motor, and an output torque signal of the motor.

According to another aspect of the present disclosure, it provides a performance monitoring system of a rotating apparatus. The performance monitoring system includes a sensing module including a plurality of sensing sensors and configured to detect a working state of the rotating apparatus and generate a working condition signal; a diagnosis module configured to receive the working condition signal from the sensing module, determine a performance state of the rotating apparatus based on the working condition signal, and generate a performance state detection result, wherein the performance state detection result includes a normal performance state and an abnormal performance state; and a communication module configured to send an alarm signal to a central control platform when the performance state detection result is the abnormal performance state; and wherein the sensing module, the diagnosis module and the communication module are integrated on a same chip.

In some embodiments, the performance monitoring system further includes an application control module configured to manage an application related to an operation of the performance monitoring system, wherein the application control module is integrated on the chip.

In some embodiments, the performance monitoring system further includes a power management module configured to supply power to the performance monitoring system, wherein the power management module is integrated on the chip.

In some embodiments, the diagnosis module includes a feature extraction submodule configured to extract a feature from the working condition signal and generate a feature signal; an abnormality detection submodule configured to determine the performance state of the rotating apparatus according to the feature signal based on an abnormality detection rule and generate the performance state detection result; a malfunction diagnosis submodule configured to determine a malfunction mode of the rotating apparatus based on the working condition signal and the feature signal when the performance state detection result is the abnormal performance state.

In some embodiments, the diagnosis module further includes a remaining useful life determination submodule configured to determine a remaining useful life of the rotating apparatus based on the feature signal.

According to the present disclosure, the performance monitoring system for the rotating apparatus includes a sensing module, a diagnosis module and a communication module, so that the performance state of the rotating apparatus can be well detected and diagnosed, and an alarm signal is sent to the central control platform through the communication module when the diagnostic result is an abnormal performance state (that is, the performance of the rotating apparatus involves a problem), which allows the performance of the rotating apparatus to be well monitored; moreover, the sensing module, the diagnosis module and the communication module are integrated on the same chip, which on the one hand allows the performance monitoring system to have higher degree of integration and is beneficial for the performance monitoring system to well monitor the performance of the rotating apparatus efficiently, and on the other hand significantly reduces the number of the chip(s) required by the performance monitoring system and hence renders a lower manufacturing cost, for example.

Furthermore, the size of the chip can be flexibly selected according to the installation position and the requirement for degree of integration of the performance monitoring system, so that the chip of the performance monitoring system can have a smaller-sized structure, which is beneficial to the installation of the chip, on the basis of higher degree of integration and lower manufacturing cost; at the same time, the chip with a smaller-sized structure also leads to more installable positions, which is convenient for the chip to be placed in the positions to be monitored, and allows for more accurate data as obtained.

BRIEF DESCRIPTION OF THE DRAWINGS

In order to more clearly illustrate the technical solutions of the embodiments of the present disclosure, the drawings necessary for the explanation of the embodiments will be briefly described in the following; it is obvious that the described drawings below are only related to some embodiments of the present disclosure, from which other drawings may be obtained by those ordinary skilled in the art without creative work. The following drawings are not deliberately drawn to the same scale as the actual size, but emphasis is placed on illustrating the main concept of the present disclosure.

DETAILED DESCRIPTION

The technical solutions in the embodiments of the present disclosure will be described clearly and completely in conjunction with the accompanying drawings. Obviously, the described embodiments are only a part of the embodiments of the present disclosure, but not all the embodiments. Based on the embodiments of the present disclosure, all other embodiments obtained by an ordinary skilled in the art without creative work also belong to the scope of protection of the present disclosure.

As illustrated in the present disclosure and the claims, words such as "a", "an", "a type of" and/or "the" are not intended to specifically refer to the singular, but may also include the plural. Generally speaking, terms "including" and "containing" only imply the inclusion of clearly identified step(s) and element(s), which, however, are not intended to constitute an exclusive list, and the method or device may also contain other step(s) or element(s).

In the present disclosure, although various references have been made to some modules of the system according to the embodiments of the present application, any number of different module(s) can be used and executed on a user terminal and/or a server. These modules are merely illustrative, and different modules may be utilized by different aspects of the system and the method.

Flowcharts are used in the present disclosure to explain the operations performed by the system according to the embodiments of the present disclosure. It should be understood that the preceding or following operations are not necessarily performed accurately in order. On the contrary, various steps can be processed in a reverse order or at the same time, as needed. At the same time, other operation(s)

can also be added to these processes, or, one or more steps can be removed from these processes.

Figure 1:
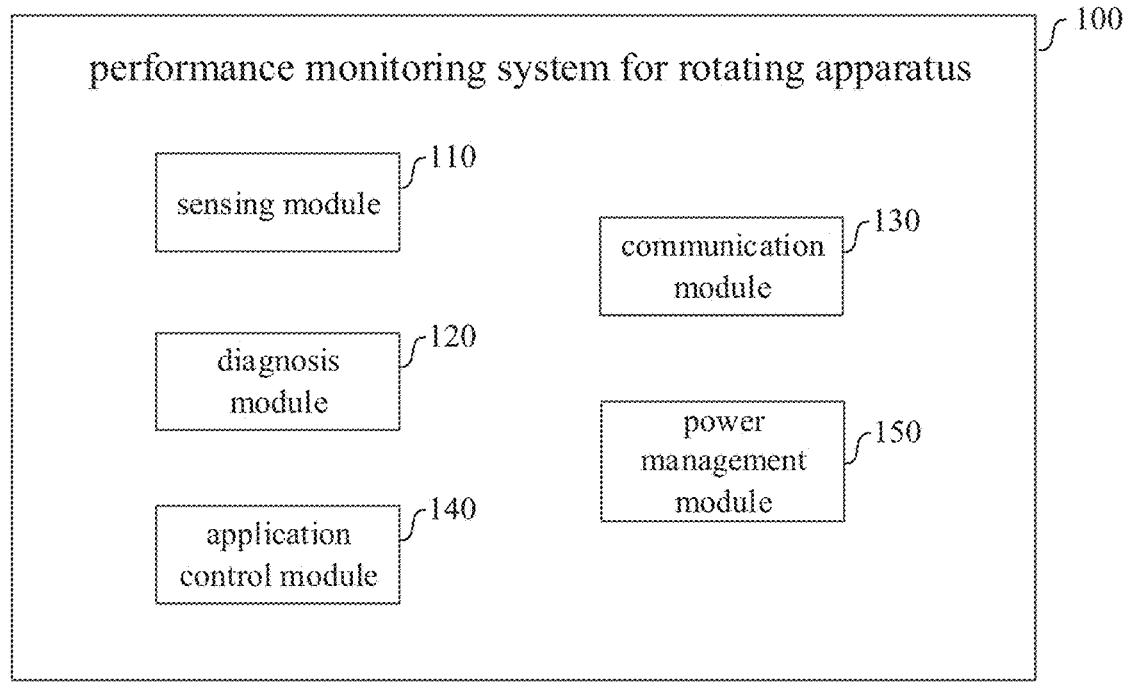
FIG. 1 illustrates an exemplary block diagram of a performance monitoring system 100 for a rotating apparatus according to an embodiment of the present disclosure.
Figure 2:
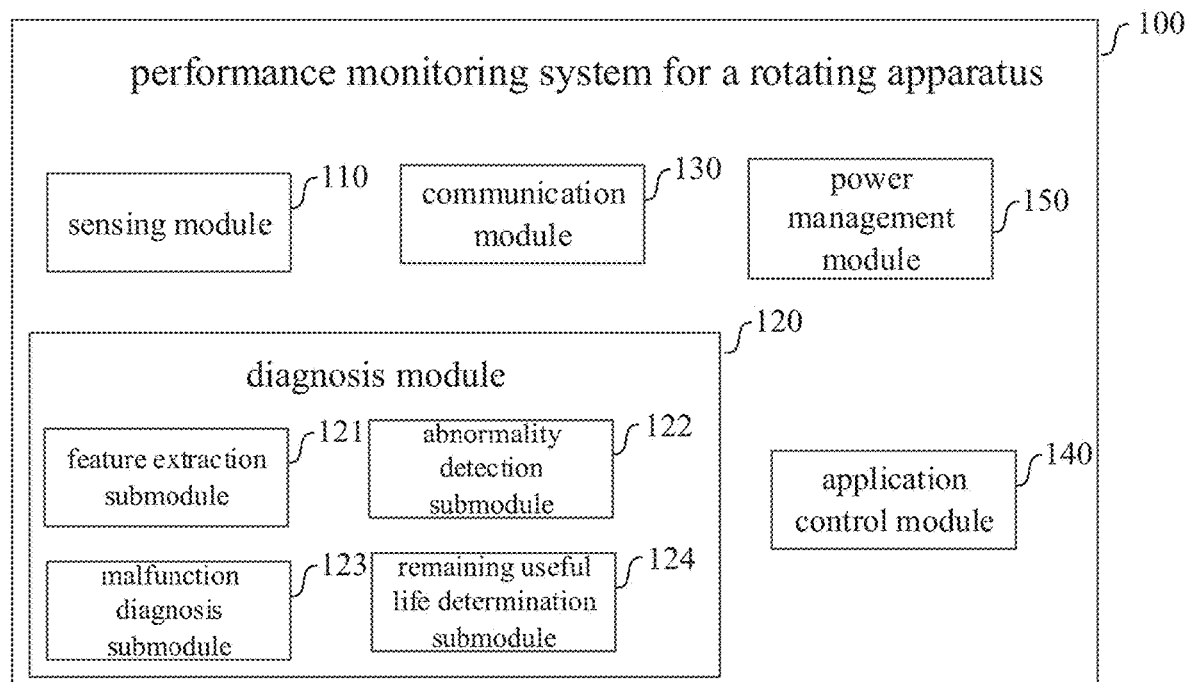
FIG. 2 illustrates an exemplary block diagram of submodules of a diagnosis module 120 according to an embodiment of the present disclosure.

FIG. 1 illustrates an exemplary block diagram of a performance monitoring system 100 for a rotating apparatus according to an embodiment of the present disclosure.

It should be understood that the rotating apparatus in the present disclosure refers to an apparatus or a component having at least a part rotatable around its own rotation axis. For example, the rotating apparatus may be a bearing, such as a lubricated bearing; alternatively, the rotating apparatus may also be a gear box. It should be understood that the embodiments of the present disclosure are not intended to be limited to the specific apparatus type of the rotating apparatus.

Referring to FIG. 1, the performance monitoring system 100 for the rotating apparatus includes, for example, a sensing module 110, a diagnosis module 120 and a communication module 130.

For example, the sensing module 110 may include a plurality of sensing sensors, and the sensing module 110 is configured to detect a working state of the rotating apparatus and generate a working condition signal.

It should be understood that the sensing sensor refers to a sensor device for monitoring the performance of the rotating apparatus. For example, according to the specific type and different application scenarios of the rotating apparatus, the sensor may include one or more of an acceleration sensor (accelerometer), a vibration sensor, a temperature sensor, an angular velocity sensor, an acoustic sensor and a magnetic sensor, for example, so as to well monitor various aspects of the performance of the rotating apparatus during working.

The working condition signal refers to a signal characterizing a working state of the rotating apparatus (the working state reflects the performance of the rotating apparatus). Depending on different types of the signal as acquired, the working condition signal may include, for example, an angular velocity signal of the rotating apparatus, an angular acceleration signal of the rotating apparatus, an apparatus temperature signal of the rotating apparatus, a vibration signal of the rotating apparatus, a noise signal of the rotating apparatus, a magnetic field signal of the rotating apparatus and the like.

It should be understood that the working condition signal can be, for example, an analog signal or a digital signal; it can be a voltage signal, a current signal, a magnetic induction intensity signal or the like. The embodiment of the present disclosure is not intended to be limited by the specific implementation of the working condition signal.

The diagnosis module 120 is configured to receive the working condition signal from the sensing module 110, determine a performance state of the rotating apparatus based on the working condition signal, and generate a performance state detection result.

The process of determining the performance state of the rotating apparatus and generating the performance state detection result, for example, can be described in more details. For example, the diagnosis module, firstly, extracts a feature from the working condition signal and generates a feature signal; and secondly, determines a performance state of the rotating apparatus according to the feature signal based on an abnormality detection rule, and generates a performance state detection result.

However, it should be understood that only an example of generating a performance state detection result is illustrated above. The embodiment of the present disclosure is not intended to be limited by the manner of obtaining the performance state detection result.

In some embodiments, the performance state detection result includes, for example, a normal performance state and an abnormal performance state. The normal performance state indicates that the rotating apparatus has satisfied performance; that is, it can achieve a performance standard set by a user/system and complete the current work task well. The abnormal performance state indicates that the performance of the rotating apparatus involves an abnormality, and the current work task cannot be completed well or there is an obvious abnormality or defection.

Compared with the case of classifying the performance state detection result into a normal performance state and an abnormal performance state, in some embodiments, the performance state detection result can be further classified as one of a normal performance state, a slightly abnormal performance state and a severely abnormal performance state, for example.

The normal performance state refers to the state where the rotating apparatus is in normal operation.

The slightly abnormal performance state refers to the state where the working state (e.g., corresponding to the working condition signal and/or the feature signal) of the rotating apparatus is partially abnormal, which, however, has no influence to the current operation and working of the rotating apparatus.

The severely abnormal performance state refers to the state where the working state (e.g., corresponding to the working condition signal and/or the feature signal) of the rotating apparatus has significant abnormality, which will affect the current operation and working of the rotating apparatus; as a result, the rotating apparatus needs to stop working as soon as possible and requires for further inspection and processing.

The communication module 130 refers to a module for enabling the performance monitoring system to communicate with the outside (including the rotating apparatus, a central control platform, a cloud platform, etc.). For example, the communication module may be configured to send an alarm signal to the central control platform when the performance state detection result is an abnormal state.

For example, when the performance state detection result is classified into a normal performance state and an abnormal performance state, the case where the performance state detection result is an abnormal state refers to the case of abnormal performance state. When the performance state detection result is classified as one of three states of a normal performance state, a slightly abnormal performance state and a severely abnormal performance state, the case where the performance state detection result is an abnormal state refers to both of the case of slightly abnormal performance state and the case of severely abnormal performance state.

The central control platform refers to a remote control platform for enabling a control of the rotating apparatus, which can be, for example, an overall control platform of a component where the rotating apparatus is located. For example, when the rotating apparatus is a lubricated bearing installed on a lathe, the central control platform is, for example, an overall control platform that can realize an overall control of the lathe.

For example, if the performance state detection result is an abnormal state (it can be an abnormal performance state/a slightly abnormal performance state/a severely abnormal performance, depending on actual situation), the communication module can communicate with the central control platform in a wireless way or a wired way, for example, and send alarm information indicating the rotating apparatus is abnormal to the central control platform, as an alarm signal.

For example, the alarm signal can be text information, or can also be binary code(s), and can also be letter(s) or digital signal. It should be understood that the embodiment of the present disclosure is not intended to be limited by the specific form of the alarm signal.

Among them, the sensing module 110, the diagnosis module 120 and the communication module 130 are integrated on a same chip. The chip refers to a miniaturized integrated circuit. The integration of the sensing module 110, the diagnosis module 120 and the communication module 130 on the same chip means that the related circuits of the sensing module 110, the diagnosis module 120 and the communication module 130 are integrated and packaged on the same chip.

It should be understood that the present disclosure is not intended to be limited by the specific packaging mode of the chip, and the chip can be packaged, for example, by technology such as COB (Chip on Board), SiP (System in Package), SOP (System on Chip), MCM (Multi ChipModel), 2.5D/3D packaging technology.

Based on the above, in the present disclosure, the performance monitoring system for the rotating apparatus is configured to include a sensing module, a diagnosis module and a communication module, so that the performance state of the rotating apparatus can be well detected and diagnosed; and an alarm signal can be sent to the central control platform through the communication module when the diagnostic result is an abnormal state (i.e., the performance of the rotating apparatus involves a problem), so that the performance of the rotating apparatus can be well monitored. Moreover, the sensing module, the diagnosis module, the communication module or other modules mentioned below are integrated on the same chip; in this way, on the one hand, the performance monitoring system has higher degree of integration, which is beneficial for the performance monitoring system to well monitor the performance of the rotating apparatus efficiently; and on the other hand, these modules are integrated into a same chip, so that the number of the chip(s) required by the performance monitoring system is greatly reduced, which allows the performance monitoring system to involve a lower manufacturing cost, for example.

In some embodiments, the performance monitoring system further includes an application control module 140 configured to manage an application related to the operation of the performance monitoring system 100.

The application control module 140 may include, for example, an alarm management submodule, an over-the-air submodule, a self-checking submodule, a configuration submodule, a real-time clock submodule and a data storage submodule.

Specifically, the alarm management submodule can, for example, manage an alarm state, an alarm reset, different alarm actions, and the like.

The over-the-air (OTA) submodule can, for example, enable updating and upgrading a firmware of the performance monitoring system.

The self-checking submodule is, for example, configured to self-check an internal circuit of the performance monitoring system, e.g., self-checking a vibration sensor, a temperature sensor, a data memory, a communication interface, and the like.

The configuration submodule is, for example, configured to adjust and manage a configuration parameter of the system.

The real-time clock submodule is, for example, configured to provide a real-time clock and calibrate a clock of the performance monitoring system by using an external clock source.

The data storage submodule is, for example, configured to record and store historical data of the performance monitoring system.

It should be understood that the application control module 140 can also include other submodules to ensure the satisfied operation of the performance monitoring system, depending on actual needs. Embodiments of the present disclosure are not intended to be limited by the specific constitution of the application control module.

Among them, the application control module is integrated on the chip, that is, the application control module, as well as the sensing module 110, the diagnosis module 120 and the communication module 130 are integrated on the same chip.

Based on the above, in the present disclosure, with the arrangement of the application control module, the application(s) related to the operation of the performance monitoring system can be well managed, thus ensuring the satisfied and reliable operation of the performance monitoring system and improving the reliability and stability of the performance monitoring system. Furthermore, the application control module, as well as the sensing module, the diagnosis module and the communication module are integrated on the same chip, so that the degree of integration of the performance monitoring system can be further increased and the manufacturing cost of the performance monitoring system can be reduced on the basis of ensuring the satisfied functional implementation of the performance monitoring system.

In some embodiments, the performance monitoring system 100 further includes a power management module 150 configured to supply power to the performance monitoring system 100.

For example, the power management module can supply power in Boost mode or Buck mode depending on actual application requirements of the performance monitoring system. Alternatively, the power management module may further include an energy collection submodule configured to collect energy from specific energy conditions such as vibration, radio emission and thermal energy, and convert the energy into electric energy to realize power supply.

Among them, the power management module 150 is integrated on the chip, that is, the power management module 150, as well as the sensing module 110, the diagnosis module 120 and the communication module 130 are integrated on the same chip. For example, the performance monitoring system 100 includes a sensing module 110, a diagnosis module 120, a communication module 130, an application control module 140 and a power management module 150.

Based on the above, in the present disclosure, the performance monitoring system further includes a power management module, so that the performance monitoring system can be well powered based on the power management module, thereby ensuring the normal use of various functions in the performance monitoring system. Moreover, the power management module is further integrated with the sensing module, the diagnosis module and the communication module into the same chip, for example, the sensing module, the diagnosis module, the communication module, the application control module and the power management module are integrated into the same chip, so that the number of the chip(s) used in the performance monitoring system can be greatly reduced, thereby lowering the manufacturing cost.

In some embodiments, a size of the chip is in the range from 0.5 mm×0.5 mm to 30 mm×30 mm.

It should be understood that, only an example of the size of the chip is illustrated above, and the size of the chip can be, for example, 20 mm×20 mm or 10 mm×10 mm, depending on actual needs and integration requirements.

Based on the above, in the present disclosure, by configuring the size of the chip to range from 0.5 mm×0.5 mm to 30 mm×30 mm, the size of the chip can be flexibly selected according to the installation position and integration degree requirements of the performance monitoring system, so that the chip of the performance monitoring system can have a smaller-sized structure on the basis of achieving high degree of integration and lower manufacturing cost, thus facilitating the installation of the chip, for example, facilitating the integration of the chip into an overall control circuit board of the central control platform. Additionally, more locations may be available for an installation of the chip with a smaller-sized structure, which is convenient for the chip to be placed in the desired monitoring location and allows for more accurate data as obtained.

In some embodiments, the size of the chip is 20 mm×20 mm. By configuring the size of the chip as 20 mm×20 mm, the chip can be miniaturized with satisfied functional integration, which is beneficial to reducing the size of the chip on the basis of lowering the manufacturing cost.

It should be understood by those skilled in the art that, the ranges for the size of the chip as listed above are only examples, and should not be regarded as constituting any limitation to the present disclosure. Other possible sizes of the chip, if applicable to the present disclosure, should also be fallen in the scope of protection of the present disclosure and are incorporated herein by reference.

In some embodiments, the diagnosis module 120 includes a feature extraction submodule 121, an abnormality detection submodule 122, and a malfunction diagnosis submodule 123.

The feature extraction submodule 121 is configured, for example, to extract a feature from the working condition signal and generate a feature signal.

It should be understood that the feature refers to a feature that can reflect the performance state of the rotating apparatus, i.e., a feature that can reflect the performance of the rotating apparatus. The feature signal refers to a signal characterizing the corresponding feature.

According to actual needs, the feature can be, for example, a kinematic feature, such as an acceleration feature and a velocity feature; alternatively, it may be a magnetic field feature or a vibration feature. Embodiments of the present disclosure are not intended to be limited by the specific type of the feature and its constitution.

For example, the feature signal can be represented in the form of voltage or in the form of current, and the embodiment of the present disclosure is not intended to be limited by the specific representation of the feature signal.

The abnormality detection submodule 122 is configured to determine the performance state of the rotating apparatus according to the feature signal based on an abnormality detection rule and generate a performance state detection result.

It should be understood that the abnormality detection rule refers to a rule for judging whether the rotating apparatus is in an abnormal performance state. The rule can be determined based on a preset algorithm or a preset calculation function, for example. Embodiments of the present disclosure are not intended to be limited by the specific constitution of the abnormality detection rule.

It should be understood that the determination of the performance state of the rotating apparatus based on the feature signal can be explained in more details. For example, if the performance state detection result includes, for example, a normal performance state and an abnormal performance state, and if the working condition signal is an apparatus temperature signal of the rotating apparatus, for example, a temperature feature can be extracted based on the working condition signal, and then a temperature feature signal of the rotating apparatus can be generated. Afterwards, for example, the temperature feature signal can be compared with a preset temperature signal threshold; if the temperature feature signal is within the range of the preset temperature signal threshold, the performance state detection result of the rotating apparatus can be determined as a normal performance state; and if the temperature feature signal exceeds the preset temperature signal threshold, the performance state detection result of the rotating apparatus can be determined as an abnormal performance state.

In the case where the performance state detection result of the rotating apparatus is a normal performance state, for example, the detection can be ended; and the working condition signal of the rotating apparatus can be obtained again after a preset time interval, then the performance state can be detected based on the diagnosis module.

The malfunction diagnosis submodule 123 is configured to determine a malfunction mode of the rotating apparatus based on the working condition signal and the feature signal when the performance state detection result is an abnormal state (for example, the abnormal performance state or the slightly abnormal performance state or the severely abnormal performance state as described above).

It should be understood that the malfunction diagnosis submodule is a submodule for further determining the specific performance anomaly and the specific malfunctioned point of the rotating apparatus when the performance state detection result of the rotating apparatus is an abnormal state (that is, it's currently indicted that the performance of the rotating apparatus is at least partially in an abnormal state).

The malfunction mode refers to the specific category of the malfunction currently existed in the rotating apparatus. For example, a variety of malfunction modes can be preset, and the working condition signal and feature signal of the rotating apparatus can be comprehensively processed based on the preset algorithm to determine the specific malfunction mode of the rotating apparatus. For example, the working condition signal and the feature signal are input via an input end of a neural network model having been well trained for malfunction determination, and processed by respective layers of the neural network, so as to finally output the malfunction mode of the rotating apparatus at an output end of the neural network for malfunction determination.

It should be understood that the embodiment of the present disclosure is not intended to be limited by the specific malfunction mode of the rotating apparatus and the specific manner of determining the malfunction mode based on the working condition signal and the feature signal.

Based on the above, in the present disclosure, by configuring the diagnosis module to include a feature extraction submodule, an abnormality detection submodule and a malfunction diagnosis submodule, a feature can be extracted based on the working condition signal and a feature signal can be generated, so that a performance state detection result can be determined based on the feature signal. Afterwards, if the performance state detection result is an abnormal state, a malfunction mode of the rotating apparatus can be determined based on the working condition signal and the feature signal. Based on this, the performance state of the rotating apparatus can be determined based on the working condition signal through the diagnosis module, and the malfunction mode can be further determined when the rotating apparatus is in an abnormal performance state, so that an abnormal situation of the rotating apparatus can be determined in time, which is beneficial to taking corresponding treatment.

In some embodiments, the abnormality detection submodule 122 may further include, for example, a feature comparison module 1221, a feature weighting module 1222, and a result output module 1223.

The feature comparison module 1221 is configured to compare each feature signal with a corresponding preset signal threshold range, and determine an abnormality rate of the feature signal based on a comparison result.

For example, the preset signal threshold range refers to a preset signal range interval presented by the feature signals of the rotating apparatus under various working performance conditions, which can be input by the user depending on actual situations or can be preset by the system, for example.

The determination of the abnormality rate based on the comparison result can be, for example, explained in more details. For example, if the temperature feature signal of the motor has preset temperature feature threshold ranges S1, S2 and S3, which correspond to a normal state, a slightly abnormal state and a severely abnormal state, respectively, and if each threshold range corresponds to one of abnormality rates P1, P2 and P3, e.g., if the temperature feature signal T1 of the motor at present falls within the range of S2, it can be determined that the abnormality rate of the temperature feature signal is P2.

However, it should be understood that only an example of determining the abnormality rate of the feature signal based on the comparison result is illustrated above. Embodiments of the present disclosure are not limited thereto.

The feature weighting module 1222 is configured to perform a weighted average to the abnormality rates of respective feature signals so as to obtain a total abnormality rate.

It should be understood that a weight ratio of each feature signal during the weighted average can be based on settings of the system, for example, or can also be selected by the user. The embodiment of the present disclosure is not intended to be limited by the specific method of setting the weightings.

The result output module 1223 is configured to determine the performance state detection result of the rotating apparatus based on the total abnormality rate and based on a preset abnormality judgment rule.

It should be understood that the preset abnormality judgment rule may include, for example, setting a plurality of total abnormality rate ranges, with different total abnormality rate ranges corresponding to different performance state detection results, and determining the performance state detection result of the rotating apparatus based on a level range of total abnormality rate into which the current abnormality rate falls.

However, it should be understood that only an exemplary flow for determining the performance state detection result of the rotating apparatus based on the total abnormality rate is illustrated above, and the embodiment of the present disclosure is not limited to this.

Based on the above, in the present disclosure, the abnormality rate is determined for each feature signal, the total abnormality rate is obtained through weighted average, and the performance state detection result of the rotating apparatus is determined based on the total abnormality rate and based on the preset abnormality judgment rule. Compared with the case where the performance of the rotating apparatus is judged only by relying on one or several feature signals, the process of judging the performance state of the rotating apparatus in the present disclosure makes reference to the current abnormal situations of respective feature signals of the rotating apparatus more comprehensively, so as to avoid a misjudgment of the performance state of the rotating apparatus caused by an obvious measurement and calculation error from a single feature signal, and to improve the reliability and accuracy of the performance state detection result.

In some embodiments, when the performance state detection result is classified as one of three states of a normal performance state, a slightly abnormal performance state and a severely abnormal performance state, the result output module 1223 is configured to compare the total abnormality rate with a first abnormality rate range, a second abnormality rate range and a third abnormality rate range, respectively, and determine the performance state detection result of the rotating apparatus based on the comparison result.

Among them, the first abnormality rate range corresponds to the normal performance state, the second abnormality rate range corresponds to the slightly abnormal performance state, and the third abnormality rate range corresponds to the severely abnormal performance state.

It should be understood that the first abnormality rate range, the second abnormality rate range and the third abnormality rate range can be set depending on actual situations, for example, the first abnormality rate range is set as 0-0.3, the second abnormality rate range is set as 0.4-0.6 and the third abnormality rate range is set as 0.7-1. However, it should be understood that only an example of abnormality rate ranges as selected is illustrated above, and the embodiment of the present disclosure is not limited to this.

The first abnormality rate range, the second abnormality rate range and the third abnormality rate range may be input by the user, for example, or may be preset by the system, and the embodiment of the present disclosure is not limited to this.

For example, determining the performance state detection result of the rotating apparatus based on the comparison result may include: comparing the total abnormality rate with the first abnormality rate range, the second abnormality rate range and the third abnormality rate range, respectively, judging which abnormality rate range the total abnormality rate falls into, and determining the specific abnormal performance state corresponding to the specific abnormality rate range as the performance state detection result of the rotating apparatus.

Based on the above, in the present disclosure, by setting the first abnormality rate range, the second abnormality rate range and the third abnormality rate range, and by determining the performance state detection result based on the result of comparing the total abnormality rate with the first abnormality rate range, the second abnormality rate range and the third abnormality rate range, respectively, the performance state of the rotating apparatus can be determined in a simple and convenient way; at the same time, the abnormality rate range can be flexibly adjusted according to actual needs, and the abnormality judgment rule can be adjusted according to actual situations, thus improving the flexibility and adaptability of the detection of performance state.

In some embodiments, the malfunction diagnosis submodule 123 determines a corresponding malfunction diagnosis frequency based on the performance state detection result.

Specifically, the malfunction diagnosis frequency refers to a frequency at which the malfunction diagnosis submodule circuit performs a malfunction diagnosis of the rotating apparatus. The frequency may be, for example, the number of times of the diagnosis as performed per unit time.

For example, in the case where the detection result of the rotating apparatus (e.g., a motor) includes three types of results, if the performance state detection result of the motor is a normal performance state, the malfunction diagnosis frequency can be set at a lower first frequency, for example; if the performance state detection result of the motor is a slightly abnormal performance state, for example, the malfunction diagnosis frequency can be set at a higher second frequency; if the performance state detection result of the motor is a severely abnormal performance state, for example, the malfunction diagnosis frequency can be set at a highest third frequency, so as to locate the malfunction as quickly as possible. It should be understood that the first frequency is less than the second frequency, and the second frequency is less than the third frequency.

It should be understood that only an exemplary manner of determining the corresponding malfunction diagnosis frequency based on the performance state detection result is illustrated above, and the embodiment of the present disclosure is not limited to this.

Based on the above, in the present disclosure, the malfunction diagnosis submodule is configured to determine a corresponding malfunction diagnosis frequency based on the performance state detection result, so that the malfunction diagnosis frequency can be flexibly increased or decreased according to different performance states. For example, the malfunction detection times can be correspondingly reduced when the performance state is normal, thus reducing the power consumption; and the malfunction diagnosis frequency can be correspondingly increased when the performance state is abnormal, thus locating the malfunctioned point in time, prolonging the useful life of the rotating apparatus, and achieving both of power consumption reduction as well as timely and reliable malfunction diagnosis.

In some embodiments, the diagnosis module 120 further includes a remaining useful life determination submodule 124 configured to determine a remaining useful life of the rotating apparatus based on the feature signal.

The remaining useful life (RUL) refers to a useful life (time) between the current moment and the moment when the rotating apparatus can no longer operate in a normal performance state.

For example, a remaining useful life model can be established based on a pre-test of useful lives of a plurality of rotating apparatuses. The remaining useful life model can, for example, establish a calculation algorithm or a calculation function between the feature signal of the rotating apparatus and the remaining useful life of the rotating apparatus, so that the remaining useful life corresponding to a rotating apparatus can be determined based on the respective feature signals of the rotating apparatus according to the preset algorithm in the model.

However, it should be understood that only an exemplary method of calculating the remaining useful life is illustrated above, and the embodiment of the present disclosure is not intended to be limited by the specific manner of determining the remaining useful life based on the feature signal.

Based on the above, in the present disclosure, the diagnosis module is configured to further include a remaining useful life determination submodule, so that the remaining useful life of the rotating apparatus can be estimated while the performance abnormality of the rotating apparatus is diagnosed, which is beneficial to setting a replacement time for the rotating apparatus accordingly based on the remaining useful life of the rotating apparatus. This prevents the rotating apparatus from being seriously damaged or damaging other apparatus/component cooperated with the rotating apparatus due to excessively long-time usage (for example, using for a time period far exceeding its remaining useful life).

In some embodiments, the communication module is further configured to generate parameter configuration information according to an input command of the central control platform, and send the parameter configuration information to the rotating apparatus to realize the configuration of the working parameters of the rotating apparatus.

The working parameters refer to the parameters related to a satisfied implementation of the working contents of the rotating apparatus. For example, an angular velocity value, a velocity value, a temperature value and the like of the rotating apparatus. Embodiments of the present disclosure are not intended to be limited by the specific constitution of the working parameters.

Based on the above, in addition to alarming in case of abnormality, the communication module can also configure the working parameters of the rotating apparatus based on the input command of the central control platform, so as to realize the real-time and highly efficient control of the rotating apparatus.

In some embodiments, the working condition signal includes at least one of an angular velocity signal of the rotating apparatus, an angular acceleration signal of the rotating apparatus, an apparatus temperature signal of the rotating apparatus, a vibration signal of the rotating apparatus, a noise signal of the rotating apparatus and a magnetic field signal of the rotating apparatus.

The angular velocity signal of the rotating apparatus refers to a signal characterizing an angular velocity of the rotating apparatus when it rotates around its own rotation axis. The angular acceleration signal of the rotating apparatus refers to a signal characterizing an angular acceleration of the rotating apparatus when it rotates around its own rotation axis.

The apparatus temperature signal of the rotating apparatus refers to a signal characterizing the current temperature of the rotating apparatus.

The vibration signal of the rotating apparatus refers to a signal characterizing the current vibration degree of the rotating apparatus.

The noise signal of the rotating apparatus refers to a signal characterizing a working noise of the rotating apparatus.

The magnetic field signal of the rotating apparatus refers to a signal characterizing the property of the magnetic field currently existed in the rotating apparatus.

Based on the above, the working condition signal is configured to include at least one of an angular velocity signal, an angular acceleration signal, an apparatus temperature signal, a vibration signal, a noise signal and a magnetic field signal of the rotating apparatus, so that the performance state of the rotating apparatus in various aspects during working can be obtained through the working condition signal, which is beneficial to monitoring the performance of the rotating apparatus.

In some embodiments, when the plurality of sensing sensors arranged in the sensing module are not enough to achieve satisfied acquisition of working condition signal of the rotating apparatus, or when a specific working condition signal needs to be acquired, the communication module can also communicate with an additional sensor arranged around the rotating apparatus, for example, to acquire a working condition signal detected by the additional sensor and send the working condition signal acquired in the additional sensor to the diagnosis module, so that the diagnosis module can detect the performance state based on the working condition signal detected by the additional sensor together with the working condition signals detected by the sensors of the sensing module, thereby monitoring the performance of the rotating apparatus.

In some embodiments, when there are multiple rotating apparatuses, the performance monitoring system for monitoring the multiple rotating apparatuses respectively can, for example, send the feature signals as extracted, the working condition signals, the performance state detection results and other information of the multiple rotating apparatuses to a cloud platform, and the cloud platform can perform further processing based on the feature signals of the multiple rotating apparatuses, for example, evaluating an overall performance state of the multiple rotating apparatuses or generating a comparison plot of performance states of the multiple rotating apparatuses.

In some embodiments, the rotating apparatus is any one of a bearing, a gear box, a motor or a fan. By implementing the rotating apparatus as the bearing, the gear box, the motor or the fan, the performance monitoring system of the present disclosure can well monitor the apparatus performance of these rotating apparatuses, so that these rotating apparatuses can perform corresponding operations in a satisfied performance state. For example, when the rotating apparatus is a gear box, the chip can be placed in a tooth plate of the gear box, for example, to obtain corresponding data immediately and accurately, detect the working state of the gear box and diagnose the same, so as to realize satisfied monitoring of the apparatus performance of the gear box.

In some embodiments, the rotating apparatus is a bearing, and the chip can be installed in an inner ring, an outer ring, a retainer or a roller of the bearing. For example, an accommodating hole is dug in the inner ring, the outer ring, the retainer or the roller of the bearing, and then the chip is placed in the accommodating hole, so that the working state of the bearing can be detected and diagnosed immediately and accurately at the installation position, and the apparatus performance of the bearing can be well monitored.

Figure 3:
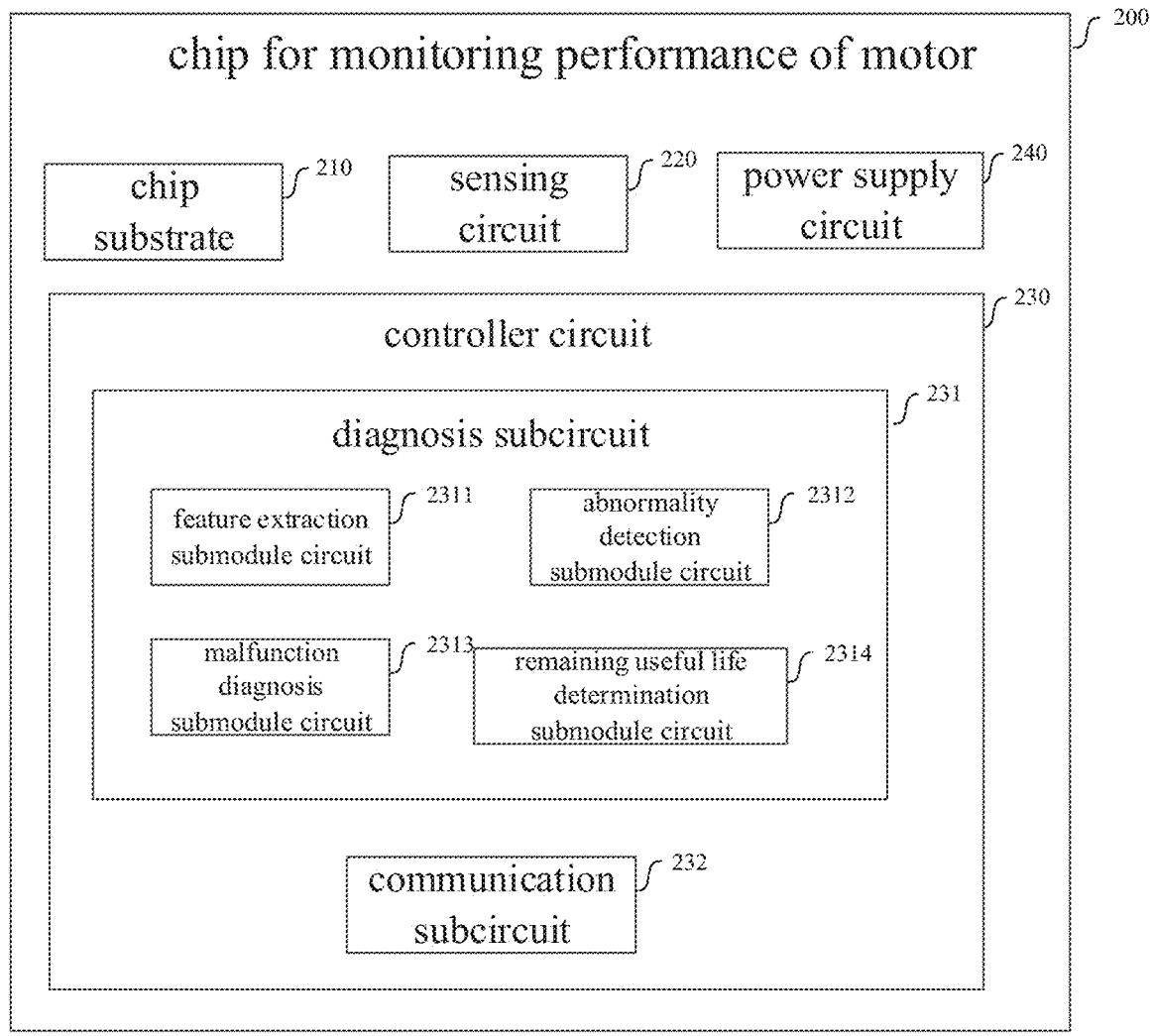
FIG. 3 illustrates a schematic diagram of a chip 200 for monitoring performance of a motor according to an embodiment of the present disclosure.

FIG. 3 illustrates a schematic diagram of a chip 200 for monitoring performance of a motor according to an embodiment of the present disclosure.

Referring to FIG. 3, according to another aspect of the present disclosure, a chip 200 for monitoring performance of a motor is provided. The chip 200 includes, for example, a chip substrate 210, a sensing circuit 220, a controller circuit 230 and a power supply circuit 240.

The chip substrate 210 refers to a substrate component for forming a main body of the chip, which aims to package and protect the chip. It should be understood that the embodiment of the present disclosure is not intended to be limited by the specific constitution of the chip substrate.

The sensing circuit 220 refers to a sensing circuit for sensing the working condition signal of the motor. The sensing circuit may include a plurality of sensing subcircuits, for example, and is configured to detect the state of the motor and generate the working condition signal of the motor.

The sensing circuit can, for example, perform the corresponding functions of the aforementioned sensing module, and includes, for example, a plurality of sensing sensors, so as to well monitor the performance of the motor in various aspects during working.

As mentioned above, the working condition signal refers to a signal characterizing a working state (the working state reflects the performance of the rotating apparatus) of the rotating apparatus (it refers to a motor here). According to different types of the signal as acquired, the working condition signal may include, for example, an angular velocity signal of the motor, an angular acceleration signal of the motor, a temperature signal of the motor, a vibration signal of the motor, a noise signal of the motor, a magnetic field signal of the motor, a rotating shaft speed signal of the motor and an output torque signal of the motor.

The controller circuit 230 refers to a circuit module for implementing a monitoring control logic, which aims to perform subsequent processing steps, such as related monitoring detection, based on the working condition signals as acquired. Specifically, the controller circuit 230 aims to perform further processing based on the signals received from the sensing circuit 220 and external devices, which may include, for example, abnormality detection, malfunction diagnosis and the like.

The controller circuit 230 may include, for example, a diagnosis subcircuit 231 and a communication subcircuit 232. The diagnosis subcircuit 231 is configured to receive the working condition signal from the sensing circuit 230, determine a performance state of the motor based on the working condition signal and generate a performance state detection result, and is operatively configured to communicate with the external device via the communication subcircuit 232 based on the performance state detection result.

It should be understood that the diagnosis subcircuit can be configured to implement the related functions of the aforementioned diagnosis module 120 in the performance monitoring system 100 for the rotating apparatus, for example. Further, the diagnosis subcircuit can be a microcontroller (for example, based on Arm core, based on MCS-51 core, based on RISCV core, etc.), a digital signal processor (DSP), a complex programmable logic device (CPLD), a field programmable gate array (FPGA), etc.

It should be understood that the communication subcircuit can be configured to implement the related function(s) of the aforementioned communication module 130 in the performance monitoring system 100 for the rotating apparatus, for example. The embodiment of the present disclosure is not intended to be limited by the specific constitution of the communication subcircuit and its communication mode.

For example, in some embodiments, under the circumstance that the performance state detection result is divided into a normal performance state and an abnormal performance state (a normal performance state indicates that the motor has satisfied performance, that is, it can reach the performance standard set by the user/system and complete the current work task well; an abnormal performance state indicates that the performance of the motor is abnormal, and the current work task cannot be well completed or there are obvious abnormalities or defections), when the performance state detection result is an abnormal performance state, the communication module can communicate with external devices (such as the central control platform) in a wireless way or a wired way, for example, and send the alarm information indicating that the motor is in an abnormal performance state to the central control platform as an alarm signal.

For example, the alarm signal can be text information, or can also be binary code(s), and can also be letter(s) or digital signal(s). It should be understood that the embodiment of the present disclosure is not intended to be limited by the specific form of the alarm signal.

For example, the controller circuit may further include a controller reset subcircuit, a data storage subcircuit, a real-time clock subcircuit, a watchdog subcircuit and the like. And the controller circuit may include, for example, an application control module subcircuit, which is configured to perform the related functions of the aforementioned application control module 140, and will not be described in detail here.

The power supply circuit 240 aims to supply power to the sensing circuit 220 and the controller circuit 230, and can perform the corresponding functions of the aforementioned power management module 150.

For example, in addition to being responsible for power supply, the power supply circuit can also provide power converter functions for different circuits and achieve low-power management.

For example, the power supply circuit may further include a Boost circuit, a Buck circuit, a low-voltage regulator circuit and the like, to supply different voltage values to different circuit modules on the chip according to actual needs.

Moreover, for example, the power supply circuit can also implement power management, such as powered-on management function; that is, it can control the powered-on sequence of respective circuits on the chip, and turn off or adjust the power supply to the currently unused circuit module(s) so as to save power.

Among them, the sensing circuit 220, the controller circuit 230 and the power supply circuit 240 are integrated on a single chip substrate.

Based on the above, in the present disclosure, the sensing circuit, the controller circuit and the power supply circuit are integrated on a single chip substrate, especially the sensing circuit and the controller circuit are integrated on a single chip substrate. Compared with the case where respective modules are distributed in different chips or hardware structures in the existing technology, the degree of integration of the monitoring chip can be greatly improved in the present disclosure, so that all the core components such as related sensors and controllers used for monitoring the motor can be integrated on the single chip substrate, which effectively improves the degree of integration of the chip; and at the same time, through such high-density integration design, the size of the chip can be greatly reduced, the miniaturization of the chip can be realized, and the cost of mass production can be lowered.

In some embodiments, the size of the chip is in the range from 0.5 mm×0.5 mm×0.5 mm to 30 mm×30 mm×20 mm; and the sensing circuit 220, the controller circuit 230 and the power supply circuit 240 on the chip substrate 210 are connected through microstrips, striplines or copper foils.

It should be understood that the three dimensions (for example, 0.5 mm×0.5 mm×0.5 mm) currently illustrated in the present disclosure correspond to the data of the length, width and height of the chip, respectively. The two dimensions illustrated in the foregoing (for example, 20 mm×20 mm) correspond to the data of the length and width of the chip, respectively.

Based on the above, in the present disclosure, by setting the size of the chip within the range from 0.5 mm×0.5 mm×0.5 mm to 30 mm×30 mm×20 mm, the size of the chip can be flexibly selected according to the arrangement density, installation positions and integration requirements of various modules on the chip, so that the chip of the performance monitoring system can have a smaller-sized structure on the basis of realizing high degree of integration and low manufacturing cost, which is beneficial to producing the chip. Moreover, the sensing circuit, the controller circuit and the power supply circuit on the chip substrate are configured to be connected through microstrips, striplines or copper foils, so that the volume of connecting lines among circuit modules can be reduced to the maximum extent, which is beneficial to realizing miniaturization of the chip.

In some embodiments, the sensing circuit 220 includes at least one of a vibration sensing subcircuit for the motor, a magnetic field sensing subcircuit for the motor and a temperature sensing subcircuit for the motor.

The vibration sensing subcircuit for the motor refers to a circuit structure for sensing the vibration signal of the motor; the magnetic field sensing subcircuit for the motor refers to a circuit structure for sensing the magnetic field signal of the motor; and the temperature sensing subcircuit for the motor refers to a circuit structure for sensing the temperature signal of the motor. Regarding the specific meanings and explanations of the vibration signal, the magnetic field signal and the temperature signal of the motor, reference can be made to the above description of the vibration signal, the magnetic field signal and the temperature signal of the rotating apparatus, which will not be repeated here.

It should be understood that the embodiment of the present disclosure is intended to be limited neither by the specific constitution and sensing mode of the subcircuit, nor by the type of the signal as acquired (analog signal or digital signal).

For example, by taking the vibration sensing subcircuit as an example, it may include, for example, a sensor (vibration sensor), an analog regulating circuit, an analog-to-digital converter circuit and a digital interface circuit.

Among them, the vibration sensor can include, for example, two types of MEMS-based sensor and piezoelectric-based sensor. The measurement range of the sensor is from 1.6 g to 500 g; and the frequency response range of the vibration sensor is usually from DC to 10 Hz for low frequency, and from 1 kHz to 20 kHz for high frequency.

The analog regulating circuit receives a signal processing response from the sensor, converts an output of the vibration sensor to an appropriate voltage range, eliminates unnecessary noises and signals, and compensates for a temperature drift, etc.

The analog-to-digital converter circuit converts an output of the analog regulating circuit into a digital signal, because the digital signal is more flexible in terms of data conversion, storage and processing.

The digital interface circuit provides a communication interface for the microcontroller system, so that not only the vibration sensor (e.g., the measurement range, etc.) can be configured, but also the digital signal of the vibration sensor can be acquired through the digital interface. The digital interface usually includes TTL, LVDS, IIC, SPI, UART, etc.

In some embodiments, the vibration sensor itself is integrated with a sensor, a regulating circuit, an analog-to-digital converter and a digital communication interface. In some other embodiments, the vibration sensing subcircuit outputs analog signals, and the functions of the analog-to-digital converter and the digital interface are implemented inside the controller circuit.

For example, the magnetic field sensing subcircuit for the motor and the temperature sensing subcircuit for the motor may have a constitution similar to the aforementioned vibration sensing subcircuit, except for the sensor components. Specifically, for a magnetic sensor based on Hall effect or magnetoresistance effect, the measurement range is 1 gauss to 1 Tesla, and the frequency width should be better than 50 Hz. The temperature sensor can be of one of the following types: a negative temperature coefficient (NTC) thermistor, a resistance temperature detector (RTD) and a semiconductor temperature sensor. The measurement range is usually −40° C. at the low point and 150° C. at the high point.

It should be understood that in the present disclosure, the sensing circuit includes at least one of the vibration sensing subcircuit for the motor, the magnetic field sensing subcircuit for the motor and the temperature sensing subcircuit for the motor, so that the sensing circuits for working condition signals, especially the sensing circuits for core working condition signals (e.g., the vibration signal, the temperature signal and the magnetic field signal of the motor) are integrated on the monitoring chip, which can facilitate the detection of related working condition signals in a simple and convenient way and significantly enhance the degree of integration of the chip at the same time as compared with the case of providing these sensing circuits separately from the chip, thereby achieving a monitoring process integrated with sensing and resolving.

In some embodiments, the diagnosis subcircuit 231 includes a feature extraction submodule circuit 2311 and an abnormality detection submodule circuit 2312.

The feature extraction submodule circuit 2311 is configured to extract a feature from the working condition signal and generate a feature signal; and the feature extraction submodule circuit 2311 can perform the related functions of the aforementioned feature extraction submodule 121 provided for the rotating apparatus.

The extraction of the feature signal includes, for example, extracting a plurality of feature signals from a single signal. For example, a vibration speed, a vibration displacement, a vibration envelope and the like are extracted from the vibration signal; a magnetic rotation speed of the motor is extracted from the magnetic field signal; a temperature gradient is extracted from the temperature signal; and so on. It also includes comprehensive processing of multiple signals to extract feature signals, and may even requires for a combination with other feature signals. For example, an inner ring malfunction feature signal of the bearing requires for comprehensive consideration of the vibration signal and the rotating shaft speed signal; and a slip ratio feature of the motor requires for comprehensive consideration of a magnetic rotation speed signal and the rotating shaft speed signal of the motor.

The abnormality detection submodule circuit 2312 is configured to determine the performance state of the motor according to the feature signal based on an abnormality detection rule, and generate the performance state detection result of the motor. The abnormality detection submodule circuit 2312 corresponds to the aforementioned abnormality detection submodule 122 provided for the rotating apparatus, and can be configured to perform the corresponding functions of the aforementioned abnormality detection submodule 122.

As mentioned above, in some embodiments, the performance state detection result includes, for example, a normal performance state and an abnormal performance state. The normal performance state indicates that the rotating apparatus has satisfied performance, that is, it can reach the performance standard set by the user/system and complete the current work task well; the abnormal performance state indicates that the performance of the rotating apparatus is abnormal, the current work task cannot be completed well or there are obvious abnormalities or defects.

For example, the process of determining the performance state of the motor based on the feature signal when the performance state detection result is divided into a normal performance state and an abnormal performance state will be explained in more details as below. For example, when the working condition signal is a temperature signal of the motor, a temperature feature of the motor can be extracted based on the working condition signal, and a temperature feature signal can be generated. After that, for example, the temperature feature signal can be compared with a preset temperature signal threshold. If the temperature feature signal is within the range of the preset temperature signal threshold, the performance state detection result of the motor can be determined as a normal performance state; if the temperature feature signal exceeds the preset temperature signal threshold, the performance state detection result of the motor can be determined as an abnormal performance state.

When the performance state detection result of the motor is a normal performance state, for example, the present detection can be ended, and the working condition signal of the motor can be obtained again after a preset interval time, then the performance state can be detected based on the diagnosis subcircuit. For the detailed description thereof, reference can be made to the foregoing and will not be repeated here.

It should be understood that, in some embodiments, the performance state detection result can be classified as one of three states of a normal performance state, a slightly abnormal performance state and a severely abnormal performance state, in comparison with the case of classifying the performance state detection result into a normal performance state and an abnormal performance state.

The normal performance state refers to the state where the motor is in normal operation.

The slightly abnormal performance state refers to the state where the working state of the motor (for example, corresponding to the working condition signal and/or the feature signal) is partially abnormal, which, however, has no influence to the current operation and working of the motor.

The severely abnormal performance state refers to the state where the working state of the motor (for example, corresponding to the working condition signal and/or the feature signal) has significant abnormality, which will affect the current operation and working of the motor; as a result, the motor needs to stop working as soon as possible and requires for further inspection and processing.

It should be understood that the process of determining the performance state of the motor according to the feature signal and generating the performance state detection result of the motor can be, for example, processing the feature signal of the motor based on a preset algorithm or a performance state detection function and obtaining the performance state detection result at an output end of the preset algorithm or function.

However, it should be understood that the process of generating the performance state detection result of the motor in the present disclosure is not limited to this.

Based on the above, in the present disclosure, the controller circuit includes a feature extraction submodule circuit and an abnormality detection submodule circuit, so that features can be extracted based on the working condition signal, feature signals can be generated and the performance state detection result can be determined based on the feature signals. Based on this, the performance state of the motor can be determined based on the working condition signal through the diagnosis module, so that corresponding treatment can be taken in time when the motor is in an abnormal performance state. Moreover, by finely classifying the performance state detection result into a normal performance state, a slightly abnormal performance state and a severely abnormal performance state, different performance conditions of the motor can be reflected in terms of various levels, which is beneficial to adopting different treatment manners based on different situations by taking both of abnormality treatment and motor operation into account.

In some embodiments, the abnormality detection submodule circuit 2312 includes, for example, a feature comparison module circuit 2312-1, a feature weighting module circuit 2312-2 and a result output module circuit 2312-3.

The feature comparison module circuit 2312-1 is configured to compare each feature signal with a corresponding preset signal threshold range, and determine an abnormality rate of the feature signal based on the comparison result.

For example, the preset signal threshold range refers to a preset signal range interval presented by the feature signals of the motor under various working performance conditions (a normal state, a slightly abnormal state and a severely abnormal state), which can be input by the user depending on actual situation or can be preset by the system, for example.

The determination of the abnormality rate based on the comparison result can be, for example, explained in more details. For example, if the temperature feature signal of the motor has preset temperature feature threshold ranges S1, S2 and S3, which correspond to a normal state, a slightly abnormal state and a severely abnormal state, respectively, and if each threshold range corresponds to one of abnormality rates P1, P2 and P3, e.g., if the temperature feature signal T1 of the motor at present falls within the range of S2, it can be determined that the abnormality rate of the temperature feature signal is P2.

However, it should be understood that only an example of determining the abnormality rate of the feature signal based on the comparison result is illustrated above. Embodiments of the present disclosure are not limited thereto.

The feature weighting module circuit 2312-2 is configured to perform a weighted average to the abnormality rates of respective feature signals so as to obtain a total abnormality rate.

It should be understood that a weight ratio of each feature signal during the weighted average can be based on settings of the system, for example, or can also be selected by the user. The embodiment of the present disclosure is not intended to be limited by the specific method of setting the weightings.

The result output module circuit 2312-3 is configured to determine the performance state detection result of the motor based on the total abnormality rate and based on a preset abnormality judgment rule.

It should be understood that the preset abnormality judgment rule may include, for example, setting a plurality of total abnormality rate ranges, with different total abnormality rate ranges corresponding to different performance state detection results, and determining the performance state detection result of the motor based on a level range of total abnormality rate into which the current abnormality rate falls.

However, it should be understood that only an exemplary flow for determining the performance state detection result of the motor based on the total abnormality rate is illustrated above, and the embodiment of the present disclosure is not limited to this.

Based on the above, in the present disclosure, the abnormality rate is determined for each feature signal, the total abnormality rate is obtained through weighted average, and the performance state detection result of the motor is determined based on the total abnormality rate and based on the preset abnormality judgment rule. Compared with the case where the performance of the motor is judged only by relying on one or several feature signals, the process of judging the performance state of the motor in the present disclosure makes reference to the current abnormal situations of respective feature signals of the motor more comprehensively, so as to avoid a misjudgment of the performance state of the motor caused by an obvious measurement and calculation error from a single feature signal, and to improve the reliability and accuracy of the performance state detection result.

In some embodiments, when the performance state detection result is classified as one of three states of a normal performance state, a slightly abnormal performance state and a severely abnormal performance state, the result output module circuit 2312-3 is configured to compare the total abnormality rate with a first abnormality rate range, a second abnormality rate range and a third abnormality rate range, respectively, and determine the performance state detection result of the motor based on the comparison result.

Among them, the first abnormality rate range corresponds to the normal performance state, the second abnormality rate range corresponds to the slightly abnormal performance state, and the third abnormality rate range corresponds to the severely abnormal performance state.

It should be understood that the first abnormality rate range, the second abnormality rate range and the third abnormality rate range can be set depending on actual situations, for example, the first abnormality rate range is set as 0-0.3, the second abnormality rate range is set as 0.4-0.6 and the third abnormality rate range is set as 0.7-1. However, it should be understood that only an example of abnormality rate ranges as selected is illustrated above, and the embodiment of the present disclosure is not limited to this.

The first abnormality rate range, the second abnormality rate range and the third abnormality rate range may be input by the user, for example, or may be preset by the system, and the embodiment of the present disclosure is not limited to this.

For example, determining the performance state detection result of the motor based on the comparison result may include: comparing the total abnormality rate with the first abnormality rate range, the second abnormality rate range and the third abnormality rate range, respectively, judging which abnormality rate range the total abnormality rate falls into, and determining the specific abnormal performance state corresponding to the specific abnormality rate range as the performance state detection result of the motor.

Based on the above, in the present disclosure, by setting the first abnormality rate range, the second abnormality rate range and the third abnormality rate range, and by determining the performance state detection result based on the result of comparing the total abnormality rate with the first abnormality rate range, the second abnormality rate range and the third abnormality rate range, respectively, the performance state of the motor can be determined in a simple and convenient way; at the same time, the abnormality rate range can be flexibly adjusted according to actual needs, and the abnormality judgment rule can be adjusted according to actual situations, thus improving the flexibility and adaptability of the detection of performance state.

In some embodiments, the diagnosis subcircuit 231 further includes a malfunction diagnosis submodule circuit 2313, and the malfunction diagnosis submodule circuit 2313 determines a corresponding malfunction diagnosis frequency based on the performance state detection result.

The malfunction diagnosis submodule circuit 2313 refers to a submodule for detecting the specific performance (especially the specific performance anomaly and the specific malfunctioned point) of the motor based on the performance state detection result of the motor. The malfunction diagnosis submodule circuit 2313 corresponds to the aforementioned malfunction diagnosis submodule 123, and can perform the related functions of the malfunction diagnosis submodule 123.

Specifically, the malfunction diagnosis frequency refers to a frequency at which the malfunction diagnosis submodule circuit performs a malfunction diagnosis of the motor. The frequency may be, for example, the number of times of the diagnosis as performed per unit time.

For example, in the case where the detection result of the motor includes three types of results, if the performance state detection result of the motor is a normal performance state, the malfunction diagnosis frequency can be set at a lower first frequency, for example; if the performance state detection result of the motor is a slightly abnormal performance state, for example, the malfunction diagnosis frequency can be set at a higher second frequency; if the performance state detection result of the motor is a severely abnormal performance state, for example, the malfunction diagnosis frequency can be set at a highest third frequency, so as to locate the malfunction as quickly as possible. It should be understood that the first frequency is less than the second frequency, and the second frequency is less than the third frequency.

It should be understood that only an exemplary manner of determining the corresponding malfunction diagnosis frequency based on the performance state detection result is illustrated above, and the embodiment of the present disclosure is not limited to this.

Based on the above, in the present disclosure, the controller circuit is configured to further include a malfunction diagnosis submodule circuit, so that a corresponding malfunction diagnosis process can be further performed after the performance state detection of the motor is completed, and the degree of integration of the motor monitoring chip is improved. Moreover, the malfunction diagnosis submodule circuit is configured to determine the corresponding malfunction diagnosis frequency based on the performance state detection result, so that the malfunction diagnosis frequency can be flexibly increased or decreased according to different performance states of the motor at present. For example, the malfunction detection times are correspondingly reduced when the performance state of the motor is normal, thus reducing the power consumption; and the malfunction diagnosis frequency is correspondingly increased when the performance state of the motor is abnormal, thus locating the malfunctioned point in time, prolonging the useful life of the motor, and achieving both of power consumption reduction as well as timely and reliable malfunction diagnosis.

In some embodiments, when the performance state detection result is an abnormal state (for example, an abnormal performance state or a slightly abnormal performance state or a severely abnormal performance state), the malfunction diagnosis submodule circuit 2313 is configured to determine a malfunction mode of the motor based on the working condition signal and the feature signal.

For example, in the case where the performance state detection result includes two states of a normal performance state and an abnormal performance state, the malfunction diagnosis submodule circuit 2313 can further determine the specific performance anomaly and the specific malfunctioned point of the rotating apparatus (as described in details in the foregoing in connection with the malfunction diagnosis submodule 123) if the performance state detection result is an abnormal performance state (that is, it's currently indicted that the performance of the rotating apparatus is in an abnormal state).

For example, in the case where the performance state detection result includes three states of a normal performance state, a slightly abnormal performance state and a severely abnormal performance state, the malfunction diagnosis submodule circuit 2313 can also be configured to, for example, perform malfunction diagnosis under both of the slightly abnormal performance state and the severely abnormal performance state of the performance state detection result.

As mentioned above, it should be understood that the malfunction mode refers to the specific category of the malfunction currently existed in the motor. For example, a variety of malfunction modes can be preset, and the working condition signal and feature signal of the motor can be comprehensively processed based on a preset algorithm (such as neural network algorithm or machine learning model) to determine the specific malfunction mode of the motor. For example, the working condition signal and the feature signal are input via an input end of a neural network model having been well trained for malfunction determination, and processed by respective layers of the neural network, so as to finally output the malfunction mode of the motor at an output end of the neural network for malfunction determination. The malfunction mode includes, for example, a malfunction that an inner ring/outer ring of a bearing falls off, a bearing roller malfunction, a bearing retainer malfunction, a motor shaft misalignment, a motor imbalance, a motor stator malfunction, a motor roller malfunction and the like.

It should be understood that the embodiment of the present disclosure is not intended to be limited by the specific malfunction mode of the motor and the specific way to determine the malfunction mode based on the working condition signal and the feature signal.

Based on the above, in the present disclosure, under the circumstance that the performance state detection result is an abnormal performance state/a slightly abnormal performance state/a severely abnormal performance state, the malfunction mode of the motor is determined by the malfunction diagnosis submodule circuit based on the working condition signal and the feature signal, so that the malfunction mode can be further determined when the motor is in an abnormal performance state, and that the abnormal situation of the motor can be determined in time, which is beneficial to taking corresponding treatment.

In some embodiments, the controller 231 further includes a remaining useful life determination submodule circuit

2314 configured to determine a remaining useful life of the motor and/or a core component of the motor based on the feature signal.

The remaining useful life (RUL) of the motor refers to the useful life (time) between the current moment and the moment when the motor can no longer operate in a normal performance state.

For example, a remaining useful life model can be established based on a pre-test of useful lives of a plurality of motors, and the remaining useful life model can, for example, establish a calculation algorithm or function between the feature signal of the motor and the remaining useful life of the motor, so that the remaining useful life corresponding to the motor can be determined based on the respective feature signals of the motor and based on the preset algorithm in the model.

The remaining useful life (RUL) of a core component of the motor refers to a useful life (time) of a core component that constitutes the motor structure and/or realizes the motor function, from the current moment to the moment when the core component can no longer operate in a normal performance state.

It should be understood that in some cases, the remaining useful life of the core component in the motor (such as the rotating shaft of the motor) will have considerable influence on the useful life of the motor. At this time, for example, the remaining useful life of the core component in the motor can be calculated through a preset useful life algorithm based on the feature signal.

However, it should be understood that only an exemplary method for calculating the remaining useful life is illustrated above, and the embodiment of the present disclosure is not intended to be limited by the specific way of determining the remaining useful life based on the feature signal.

Based on the above, in the present disclosure, the controller circuit is configured to further include a remaining useful life determination submodule circuit, and a remaining useful life of the motor and/or a core component of the motor is determined based on the feature signal, so that the remaining useful life of the motor and/or the core component of the motor can be estimated while the performance abnormality of the motor is diagnosed, which is beneficial to setting a replacement time for the motor accordingly based on the remaining useful life of the motor. This prevents the motor/core component from being seriously damaged or causing damage to other apparatus/component cooperated with the motor/core component due to excessively long-time usage (for example, using for a time period far exceeding its remaining useful life).

In some embodiments, the communication subcircuit is further configured to generate parameter configuration information according to an input command of an external device, and send the parameter configuration information to the controller circuit to realize the configuration of the working parameters of the motor. The specific functions have been described in details in the foregoing in connection with the communication module, and will not be repeated here.

In some embodiments, the working condition signal of the motor includes at least one of a vibration signal of the motor, a magnetic field signal of the motor, a temperature signal of the motor, a rotating shaft speed signal of the motor, and an output torque signal of the motor.

The vibration signal of the motor refers to a signal characterizing the current vibration degree of the motor, which can be, for example, a mechanical vibration signal of the motor.

The magnetic field signal of the motor refers to a signal characterizing the properties of the magnetic field currently existed in the motor, which can be, for example, a magnetic intensity signal of the motor.

The temperature signal of the motor refers to a signal characterizing the current temperature of the motor.

The rotating shaft speed signal of the motor refers to a signal characterizing the rotation speed of the rotating shaft of the motor when it rotates around its own rotation axis, which can be, for example, a rotating angular velocity signal or a rotating angular acceleration signal.

The output torque signal of the motor refers to a signal characterizing the magnitude of a torque output by the output shaft of the motor.

Based on the above, in the present disclosure, the working condition signal of the motor is configured to include at least one of a vibration signal of the motor, a magnetic field signal of the motor, a temperature signal of the motor, a rotating shaft speed signal of the motor and an output torque signal of the motor, so that the performance situations of the motor in various aspects during working can be obtained through the working condition signal, which is beneficial to monitoring the performance of the motor.

In some embodiments, when the plurality of sensing sensors of the sensing subcircuit arranged in the sensing circuit are not enough to achieve satisfied acquisition of the working condition signal of the motor, or when a specific working condition signal needs to be acquired, the communication subcircuit can, for example, communicate with an additional sensor arranged around the motor to acquire a working condition signal detected by the additional sensor, and send the working condition signal obtained by the additional sensor to the diagnosis subcircuit, so that the working condition signal detected by the additional sensor and the working condition signal detected by the sensing subcircuit can be jointly utilized as the basis for performance monitoring.

In some embodiments, when there are a plurality of motors, the chip used for monitoring the plurality of motors respectively can, for example, send the extracted information such as a plurality of feature signals, working condition signals, performance state detection results and the like to an external device (for example, a cloud platform) for further processing, such as evaluating an overall performance state of the plurality of motors, or generating comparison charts of performance states of the plurality of motors.

The program part in the technology can be regarded as a "product" or "article" in the form of executable codes and/or related data, which is participated in or realized by a computer-readable media. A tangible, permanent storage media can include an internal storage or a memory used by any computer, processor, or similar devices or related modules. For example, various semiconductor memories, tape drives, disk drives, or similar devices that can provide storage functions for software.

All or part of software may sometimes communicate through a network, such as the Internet or other communication networks. Such communication can load software from one computer device or processor to another one. Therefore, another type of medium that enables transfer of software elements can also be used as a physical connection between local devices, such as light waves, electric waves, electromagnetic waves and the like, which are propagated through electric cables, optical cables or air. A physical media used for carrying waves, such as electric cables, wireless connections or optical cables, can also be considered as media for carrying software. Unless the usage here is limited to tangible "storage" media, any other terms indicative of a computer or machine "readable media" refers to the media that is participated in an execution of any instructions by a processor.

In the present disclosure, specific words are used to describe the embodiments of the present disclosure. Words such as "the first/second embodiment", "an embodiment" and/or "some embodiments" refer to a certain feature, structure or characteristic related to at least one embodiment of the present disclosure. Therefore, it should be emphasized and noted that references to "an embodiment" or "one embodiment" or "an alternative embodiment" appeared at different places for two or more times in this specification do not necessarily refer to the same embodiment. Moreover, some features, structures or characteristics in one or more embodiments of the present disclosure can be appropriately combined.

Additionally, those skilled in the art can understand that various aspects of the present disclosure can be illustrated and described through several patentable categories or situations, including a combination of any new and useful processes, machines, products or substances, or any new and useful improvements thereon. Accordingly, various aspects of the present disclosure can be completely executed by hardware, completely executed by software (including firmware, resident software, microcode, etc.), or executed by a combination of hardware and software. All the hardware or software above can be referred to as "block", "module", "engine", "unit", "component" or "system". Furthermore, various aspects of the present disclosure may be embodied as a computer product located in one or more computer-readable media, which includes computer-readable program codes.

Unless otherwise defined, all terms (including technical and scientific terms) used herein have the same meaning as commonly understood by one of ordinary skilled in the art to which the present disclosure belongs. It should also be understood that terms such as those defined in general dictionaries should be interpreted as having meanings consistent with their meanings in the context of the related art, and should not be interpreted in an idealized or extremely formal sense, unless explicitly defined herein.

The above is an explanation of the present disclosure, and should not be considered as a limitation thereto. Although several exemplary embodiments of the present disclosure have been described, those skilled in the art will easily understand that many modifications can be made to the exemplary embodiments without departing from the novel teaching and advantages of the present disclosure. Therefore, all these modifications are intended to be included within the scope of the present disclosure as defined by the claims. It should be understood that the above description of the present disclosure should not be considered as limited to the specific embodiments as disclosed, and modifications to the disclosed embodiments and other embodiments are intended to be included within the scope of the appended claims. The present disclosure is defined by the claims and their equivalents.

What is claimed is:

1. A chip for monitoring performance of a motor, the chip comprising:
    a chip substrate;
    an sensing circuit comprising a plurality of sensing subcircuits and configured to detect a state of the motor and generate a working condition signal of the motor; and
    a controller circuit comprising a diagnosis subcircuit and a communication subcircuit, wherein the diagnosis subcircuit is configured to receive the working condition signal from the sensing circuit, determine a performance state of the motor based on the working condition signal, and generate a performance state detection result, and is operatively configured to communicate with an external device via the communication subcircuit based on the performance state detection result, the diagnosis subcircuit comprising a feature extraction submodule circuit and an abnormality detection submodule circuit, the feature extraction submodule circuit being configured to extract a feature from the working condition signal and generate a feature signal, the abnormality detection submodule circuit being configured to determine the performance state of the motor according to the feature signal based on an abnormality detection rule and generate the performance state detection result of the motor;
    wherein the sensing circuit and the controller circuit are integrated on the chip substrate.

2. The chip according to claim 1, wherein a size of the chip is in the range from 0.5 mm×0.5 mm×0.5 mm to 30 mm×30 mm×20 mm; and the sensing circuit and the controller circuit on the chip substrate are connected through a microstrip, a stripline or a copper foil.

3. The chip according to claim 1, wherein the sensing circuit comprises at least one selected from the group consisted of a vibration sensing subcircuit for the motor, a magnetic field sensing subcircuit for the motor and a temperature sensing subcircuit for the motor.

4. The chip according to claim 1,
    wherein the performance state detection result is one selected from the group consisting of a normal performance state, a slightly abnormal performance state and a severely abnormal performance state.

5. The chip according to claim 4, wherein the abnormality detection submodule circuit comprises:
    a feature comparison module circuit configured to compare each feature signal with a corresponding preset signal threshold range, and determine an abnormality rate of the feature signal based on a comparison result;
    a feature weighting module circuit configured to perform a weighted average to abnormality rates of respective feature signals to obtain a total abnormality rate; and
    a result output module circuit configured to determine the performance state detection result of the motor based on the total abnormality rate and based on a preset abnormality judgment rule.

6. The chip according to claim 5, wherein the result output module circuit is configured to compare the total abnormality rate with a first abnormality rate range, a second abnormality rate range and a third abnormality rate range, respectively, and determine the performance state detection result of the motor based on a comparison result;
    wherein the first abnormality rate range corresponds to the normal performance state, the second abnormality rate range corresponds to the slightly abnormal performance state, and the third abnormality rate range corresponds to the severely abnormal performance state.

7. The chip according to claim 4, wherein the diagnosis subcircuit further comprises a malfunction diagnosis submodule circuit, and the malfunction diagnosis submodule circuit determines a corresponding malfunction diagnosis frequency based on the performance state detection result.

8. The chip according to claim 7, wherein the malfunction diagnosis submodule circuit is configured to determine a malfunction mode of the motor based on the working condition signal and the feature signal when the performance state detection result is the slightly abnormal performance state or the severely abnormal performance state.

9. The chip according to claim 4, wherein the diagnosis subcircuit further comprises a remaining useful life determination submodule circuit configured to determine a remaining useful life of the motor and/or a core component of the motor based on the feature signal.

10. The chip according to claim 1, wherein the working condition signal of the motor comprises at least one selected from the group consisted of a vibration signal of the motor, a magnetic field signal of the motor, a temperature signal of the motor, a rotating shaft speed signal of the motor and an output torque signal of the motor.

11. A performance monitoring system for a rotating apparatus, comprising:
   a sensing module comprising a plurality of sensing sensors and configured to detect a working state of the rotating apparatus and generate a working condition signal;
   a diagnosis module configured to receive the working condition signal from the sensing module, determine a performance state of the rotating apparatus based on the working condition signal, and generate a performance state detection result; wherein the performance state detection result comprises a normal performance state and an abnormal performance state; and
   a communication module configured to send an alarm signal to a central control platform when the performance state detection result is the abnormal performance state;
   wherein the sensing module, the diagnosis module and the communication module are integrated on a same chip.

12. The system according to claim 11, further comprising an application control module configured to manage an application related to an operation of the performance monitoring system, and wherein the application control module is integrated on the chip.

13. The system according to claim 11, further comprising a power management module configured to supply power to the performance monitoring system, and wherein the power management module is integrated on the chip.

14. The system according to claim 11, wherein the diagnosis module comprises:
   a feature extraction submodule configured to extract a feature from the working condition signal and generate a feature signal;
   an abnormality detection submodule configured to determine the performance state of the rotating apparatus according to the feature signal based on an abnormality detection rule and generate the performance state detection result; and
   a malfunction diagnosis submodule configured to determine a malfunction mode of the rotating apparatus based on the working condition signal and the feature signal when the performance state detection result is the abnormal performance state.

15. The system according to claim 14, wherein the diagnosis module further comprises a remaining useful life determination submodule configured to determine a remaining useful life of the rotating apparatus based on the feature signal.

16. The system according to claim 12, further comprising a power management module configured to supply power to the performance monitoring system, and wherein the power management module is integrated on the chip.

* * * * *